United States Patent Office 2,819,302
Patented Jan. 7, 1958

2,819,302

SYNTHETIC DRYING OILS

Donald F. Koenecke, Louis A. Mikeska, and Anthony H. Gleason, Westfield, N. J., assignors to Esso Research and Engineering Company, a corporation of Delaware No Drawing. Application June 25, 1954
Serial No. 439,492

3 Claims. (Cl. 260—519)

This invention relates to an improvement in the drying properties of liquid diolefin polymers and more particularly relates to the drying of baked films.

It is known to prepare synthetic drying oils by polymerizing conjugated diolefins, such as butadiene, isoprene, piperylene, etc., or copolymerizing such diolefins with vinyl aromatics such as styrene, etc. The process is carried out in the presence of catalysts such as sodium, peroxides and the like. Thus, oils are prepared which, when dissolved in an equal quantity of hydrocarbon solvent such as mineral spirits, generally have a viscosity between about 0.1 and 20 poises, or about 400 to 20,000 poises when diluent-free.

The oils thus obtained are particularly useful as protective coatings in the form of colorless varnishes or enamels and may be either air-dried or baked. However, it has been found by experience that the coatings, particularly the baked films, have a tendency to dry on the surface. When thicker films of the varnish or enamel are applied to metal to be cured by baking, the surface dries, sealing off the lower portion of the film thus retarding oxidation and curing with the result that a tack-free surface covering a soft substrate is obtained. The soft portion makes the film subject to marring and abrasion without appreciable force being applied. These disadvantages have restricted the application of these synthetic drying oils to films of about one mil (0.001 inch) or less in thickness. Since many uses such as appliance finishes and primer surfacers require films of 1.5 mils or greater, it is obvious that there are many applications in which these oils are not suitable.

It is known, in accordance with the teachings of U. S. 2,652,342, that the pigment-wetting properties of the synthetic hydrocarbon drying oils can be improved by reacting the oil at 50 to 250° C. with .01 to 2.5% maleic anhydride, chloro-maleic anhydride, or citraconic anhydride. However, this treatment has little, if any effect on the drying properties of the oil films.

In accordance with the present invention, the film-hardness of a polymer drying oil is increased by first reacting the oil with maleic anhydride or similar reagent as described in the above patent and then reacting this product with an organic compound containing at least two functional groups, one of which is a primary or secondary amine and one of which is a hydroxyl group. It is preferable to react the oil with compounds having at least three functional groups one of which is an amine and one, preferably two, of which are hydroxyl groups. Any amount of the organic compound can be used from about 0.1 up to about one mole per mole of available COOH or equivalent groups on the treated oil.

The synthetic oils to be treated in accordance with the present invention are oily polymers of butadiene, isoprene, dimethyl butadiene, piperylene, methyl pentadiene or other conjugated diolefins having four to six carbon atoms per molecule. Instead of polymerizing any of the aforesaid diolefins alone, they may be copolymerized in admixtures with each other or in admixtures with minor amounts of ethylenically unsaturated monomers copolymerizable therewith, e. g., with 5 to 40% of styrene, styrenes having alkyl groups substituted on the ring such as para methyl styrene, dimethyl styrene or diethyl styrene, acrylonitrile, methacrylonitrile, methyl acrylate, methyl methacrylate, vinyl isobutyl ether, methyl vinyl ketone, and isopropenyl methyl ketone. Such synthetic oils may be advantageously prepared by mass polymerization either in the presence of a hydrocarbon soluble peroxide catalyst such as benzoyl peroxide or cumene hydroperoxide, or in the presence of metallic sodium when the monomers consist of a diolefin or of a mixture of a diolefin with a styrene compound. Suitable polymerization procedures are illustrated below in runs A and B. Throughout the present description it will be understood that all proportions are expressed on a weight basis unless otherwise specified.

*Run A.*—For example, 100 parts of butadiene-1,3, 50 parts of straight run mineral spirits boiling between 150 and 200° C. (Varsol), 3 parts of t-butyl hydroperoxide (60% pure) and 0.75 part of diisopropyl xanthogen disulfide are heated in a closed reactor at about 90° C. for 40 hours, whereupon the residual pressure is released and unreacted butadiene is allowed to volatilize from the polymerized mixture at 70° C. The resulting product, which is a clear, water-white solution, consists typically of about 60 parts of oily polymer of butadiene, about 4 parts of butadiene dimer, plus solvent and some t-butyl alcohol. This solution of polymer is then preferably fractionated to remove the dimer and usually adjusted to 50% non-volatile matter content. The non-volatile constituent, which is the oily polymer of butadiene, has a molecular weight between 1,000 and 10,000, preferably between 2,000 and 5,000. It will be understood, of course, that the foregoing procedure is only illustrative and that it can be modified in many ways, particularly as described in U. S. Patent 2,586,594 of Arundale et al., issued on February 19, 1952, which describes alternative monomers, catalysts, reaction diluents, polymerization modifiers, suitable ranges of proportions of the various ingredients, suitable ranges of polymerization conditions, etc.

*Run B.*—An alternative polymerization method using sodium as catalyst is illustrated as follows: 80 parts of butadiene-1,3, 20 parts of styrene, 200 parts of straight run mineral spirits boiling between 150 and 200° C., 40 parts of dioxane, 0.2 part of isopropanol and 1.5 parts of finely dispersed sodium are heated at about 50° C. in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide or glacial acetic acid or the like and filtered. The colorless filtrate is then fractionally distilled to remove the alcohol and modifiers such as dioxane. Finally, additional hydrocarbon solvent is preferably distilled off until a product containing about 50–95% non-volatile matter is obtained, the non-volatile matter being a drying oil having a molecular weight below 10,000, preferably between about 2,000 to 5,000.

Again it will be understood that the described sodium polymerization method may be varied considerably as by omitting the styrene co-reactant; or by adding the styrene only after the polymerization of butadiene monomer has begun; or dioxane may be replaced by 10 to 35 parts of another ether modifier having more than 2 carbon atoms such as methyl ethyl ether, or the modifier may be omitted altogether, especially when it is not essential to obtain a perfectly colorless product. Similarly, isopropanol is not necessary, though aliphatic alcohols generally have the beneficial effect of promoting the reaction when present in amounts ranging from about 2 to 50% based on the weight of sodium catalyst. Furthermore, the mineral spirits may be replaced by other inert hydrocarbon diluents boiling between about −15° C. and 200° C., e. g., butane, benzene, xylene, cyclohexane and the like. The diluents are usually used in amounts ranging from 50 to 500 parts per 100 parts of monomer. The reaction temperature may vary between about 40° C. and 105° C., preferably around 65 to 85° C. As a catalyst, 0.1 to 10 parts of dispersed metallic sodium is used per 100 parts of monomers, sodium particle sized below 100 microns being particularly effective.

The first material to be reacted with the liquid polymer drying oil includes any unsaturated organic compound having a carboxyl group or anhydride or ester thereof, e. g. maleic acid, fumaric acid, thioglycolic acid, thiosalicylic, mercaptophthalic acid, itaconic acid, mesaconic acid, citraconic acid, acrylic acid, their anhydrides or esters. While these reagents may be added in any amount up to incipient gelation, amounts between 0.01% and 15% are generally suitable. The reaction is carried out at a temperature between 50 and 250° C., preferably between 180 and 220° C. The necessary time for such treatment varies between about 15 minutes and two hours depending on the temperature employed.

Materials suitable for reacting with the above-treated oils are those compounds having at least two, preferably three functional groups. It is essential that one of these groups be a primary or secondary amine and another be a hydroxyl group. Any number of hydroxyl groups may be present as well as other substituents. A particularly desirable class of compounds suitable for reacting with the treated oils are monoprimary and monosecondary amino alcohols, the carbon structure of which is aliphatic, aromatic or aliphatic-aromatic and which may contain oxygen and sulfur in the skeleton. Suitable compounds include ethanolamine; diethanolamine; 2-amino-2-methylpropane diol-1,3; 2-amino-2 (hydroxymethyl) propane diol-1,3; aminobenzyl alcohol; aminoxylyl alcohol; aminodiethylene glycol; and the like. The reaction is carried out at temperatures between 20 and 250° C.

While it is not desired to limit the invention by any theory of the reactions involved, it is believed that the following represents the course of the reactions involved:

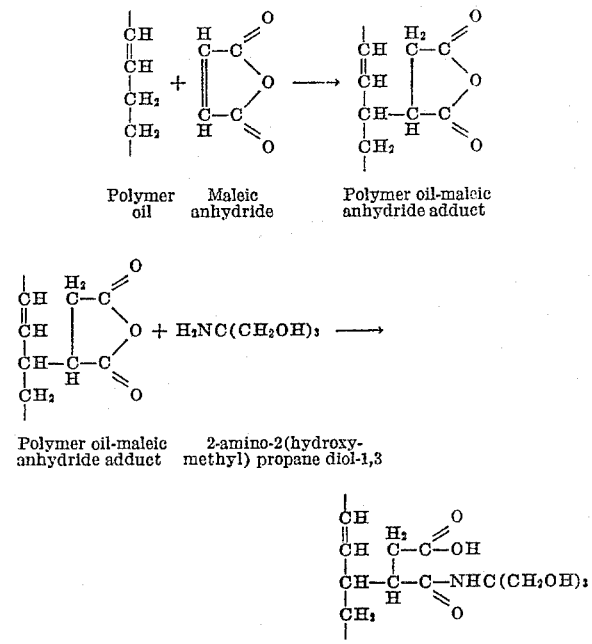

Thus in the first step the polymer oil adds to the maleic anhydride to form the adduct which is then reacted with the amine to form an amide and a free acid group. In the presence of additional amounts of the polyol, the amine salt of the acid also forms at lower temperatures.

At temperatures above 100° C. the salt may be more slowly dehydrated to the diamide. Thus a considerable number of hydroxymethyl groups can be added by means of stable amide groups. The polymer thus treated contains controlled amounts of polar groups which are also subject to oxidation, polymerization, esterification, and acetal and ketal formation in the process of film formation with the result that films are obtained with greatly increased hardness.

The following specific examples are presented to illustrate typical applications and effects of the present invention. All quantities are expressed in this specification and claims on a weight basis unless stated otherwise.

Example 1

A butadiene-styrene drying oil was prepared from the following charge:

|  | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight run mineral spirits; API gravity, 49.0; flash 105° F.; boiling range, 150 to 200° C.; solvent power, 33–37 kauri-butanol value (reference scale: benzene—100 K. B. value, n-heptane 25.4 K. B. value).
[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and the product was finished to contain 50% non-volatile matter as described in earlier parts of this specification. The resulting product had a viscosity of 1.5 poises at 50% N. V. M. and the non-volatile portion thereof had an average molecular weight of about 3,000. The finished oil was subjected to an after treatment which consisted in refluxing the oil at 175° C. for two hours in the presence of 1.0% maleic anhydride. The resulting oil was then poured on thin steel panels to form coatings of 1.65 mils and baked for 30 minutes at 325° F. The oil proved to be rather slow drying and found to have a Sward hardness value of 5–8 (Glass—100).

Example 2

80 g. of the polymer oil of Example 1 was reacted with 1% maleic anhydride and the resulting product was heated with 1 g. of 2 amino, 2 (hydroxymethyl) propane diol-1,3 and 40 g. of xylene in a 250 ml. beaker. The amount of $H_2NC(CH_2OH)_3$ was very slightly in excess (theoretical 0.985 g.) of the theoretical reactant quantity. The mixture was slowly heated to 130° C. to remove the benzene and to react the amine. After 20 minutes, the mixture was nearly clear and nearly all the $H_2NC(CH_2OH)_3$ was reacted. The mixture was cooled and reduced with petroleum ether and filtered. Less than 0.05 g. of material remained unreacted, therefore, it was concluded that at least 90% reaction occurred. The reaction mixture was then evaporated down to 50% non volatile content in xylene.

Films baked 30' @ 300° F. or 325° F. at thicknesses of 1.7–2.0 mils were found to have Sward hardness values of 18–20%.

The modification increased the color of the polymer very slightly and increased the viscosity. Neither increase was serious or objectionable.

A repeat run gave similar results indicating the results could be readily duplicated. In the repeat test, the polymer was tested for nitrogen (organic) by the soda-lime qualitative test. The test was positive, indicating nitrogen, with or without water washing. The nitrogen was combined.

Example 3

40 g. of the polymer of Example 1 which was first reacted with 1.0% maleic anhydride was heated with 0.45 g. 2-amino, 2-methyl propane diol-1,3

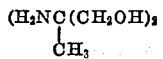

and the mixture heated with stirring to 130° C. to remove the benzene and effect the reaction. After 15 minutes the reaction appeared to be complete forming a viscous clear homogeneous oil. A film 1.65 mils thick baked for 30 minutes at 325° F. gave a Sward hardness of 16.

Example 4

Example 2 was repeated except that the polymer oil was not reacted with maleic anhydride and 1 g. of the 2-amino, 2 (hydroxymethyl) propane diol-1,3 was used.

The mixture was heated to 135° C.±5° for 20 minutes but remained cloudy with undissolved or unreacted material. The mixture was cooled, diluted with an equal volume of benzene and filtered. 0.8 g. of the $$H_2NCCH_3(CH_2OH)_2$$

was recovered on the filter paper. A sample of the solution was washed with water 6 times, evaporated down and tested for nitrogen with soda lime. The test was negative indicating no combined organic nitrogen. Therefore, no addition occurred.

The above examples serve to demonstrate the method of applying the invention. The limitations are that maleic anhydride or a similar acid or anhydride must be first added to the polymer. Following that addition, amino alcohols can be added to the extent of their equivalent amounts to form an amide, amide-acid or diamide. One more limitation is that it is preferable to maintain the amount within the limits of a practical working viscosity in the chosen solvent system aromatic or aliphatic hydrocarbons, oxygenated solvents or combinations.

It is readily noted that the film hardness of Examples 2 and 3 exhibits outstanding increases over the control oil. In several instances, the hardness of thicker films is almost double that of the thinner control films. Where thicknesses are equal, the hardness of the examples is as much as 4 times higher. The tendency for hardness to be lower in all the thicker films baked at a given temperature is natural. Example 3 with no addition occurring shows no hardness improvement.

Example 5

*Part A.*—138.6 g. of the oily polymer of Example 1 at 75% nonvolatile content in xylene was reduced to 50% nonvolatile content with additional xylene. This polymer had previously been reacted with 3% maleic anhydride and had a viscosity of 1.2 poises at 50% in xylene. The oil was placed in a flask equipped with a reflux condenser and an agitator. Then 3.12 g. of 2-amino, 2-methyl propane diol-1,3 were added. The mixture was heated to xylene reflux temperature with stirring for 2 hours. During this time it became slightly hazy and the viscosity was increased. At the end of this time the 2-amino, 2-methyl propane diol-1,3 was all reacted and the mixture was allowed to cool. Films were drawn down 3 mils wet on tinplate and baked at 325° F. for 30 minutes. The film hardness was improved as indicated by the following comparison.

Example, 1.8 mils Sward hardness _____ 14
Original oil, 1.8 mils Sward hardness _____ 5

*Part B.*—200 grams of the solution from Part A and 100 g. of titanium dioxide were ground on a roller mill to form an enamel. Films of the enamel were drawn down 3 mils wet on tinplate and baked 30' at 325° F. The film hardness of the enamel was improved as indicated by the following comparison.

Example, 1.95 mils thick Sward _____ 14
Control, 1.95 mils thick Sward _____ 4

The nature of the present invention having been thus fully set forth and specific examples of the same given, what is claimed as new and useful and desired to be secured by Letters Patent is:

1. A process for improving the hardnesse of films of polymeric drying oils prepared by polymerization of 60 to 100 parts of a conjugated diolefin of 4 to 6 carbon atoms and 40 to 0 parts of styrene in the presence of metallic sodium which comprises first reacting the oil at a temperature between 50° and 250° C. with maleic anhydride and then reacting the resulting product with about 0.1 to 1 mole, per mole of available carboxyl groups, of a compound selected from the group consisting of 2-amino-2-methyl propane diol-1,3 and 2-amino-2-(hydroxymethyl) propane diol-1,3.

2. A process for improving the hardness of films of polymeric drying oils prepared by polymerization of 60 to 100 parts of a conjugated diolefin of 4 to 6 carbon atoms and 40 to 0 parts of styrene in the presence of metallic sodium which comprises first reacting the oil at a temperature between 50° and 250° C. with maleic anhydride and then reacting the resulting product with about 0.1 to 1 mole, per mole of available carboxyl groups, of 2-amino-2 (hydroxymethyl) propane diol-1,3.

3. A process for improving the hardness of films of polymeric drying oils prepared by polymerization of 60 to 100 parts of a conjugated diolefin of 4 to 6 carbon atoms and 40 to 0 parts of styrene in the presence of metallic sodium which comprises first reacting the oil at a temperature between 50° and 250° C. with maleic anhydride and then reacting the resulting product with about 0.1 to 1 mole, per mole of available carboxyl groups, of 2-amino-2-methyl propane diol-1,3.

References Cited in the file of this patent

UNITED STATES PATENTS

| | | |
|---|---|---|
| 2,476,955 | Bloch | July 26, 1949 |
| 2,652,342 | Gleason | Sept. 15, 1953 |
| 2,683,162 | Gleason | July 6, 1954 |
| 2,733,267 | Koenecke | Jan. 3, 1956 |

FOREIGN PATENTS

| | | |
|---|---|---|
| 485,883 | Great Britain | May 26, 1938 |